3,425,986
PROCESS AND COMPOSITION OF MATTER
George B. Markert, Chester, Va., assignor to The Firestone Tire & Rubber Company, Akron, Ohio, a corporation of Ohio
No Drawing. Filed July 28, 1965, Ser. No. 475,580
U.S. Cl. 260—45.75         2 Claims
Int. Cl. C08g 41/02, 51/00

ABSTRACT OF THE DISCLOSURE

The viscosity of nylon 6 (poly-omega-caproamide) is increased by the presence therein of 0.00005 to 0.003% of metal pyrophosphate. A suitable metal is titanium, vanadium, chromium, manganese, iron, cobalt, nickel, copper, zinc, zirconium, molybdenum, silver, cadmium, tin, antimony, lead or bismuth. Such improved nylon can be further stabilized against degradation by light and heat by additionally adding 0.0025% to 0.05% of copper supplied by a copper salt soluble in caprolactam. Suitable copper salts include the chloride, bromide, fluoride, sulfite, acetate, sulfate, formate, stearate and naphthenate. The increase in the nylon viscosity is preferably obtained by subjecting the nylon containing pyrophosphate ions to a vacuum while the nylon is in a liquid state.

---

This invention relates to a poly-omega-caproamide (also known as poly-caprolactam and as nylon 6) suitable for melt-extruding into filament form for production of textile yarns and tirecords. The invention also relates to a process for producing such improved nylon 6.

Nylon 6, a polyamide resin, is commercially manufactured by the polymerization of molten epsilon-caprolactam (also known as omega-caprolactam). In order to control the molecular weight of the nylon to a desired value, a substance capable of forming end-groups on the nylon molecules is usually present in the polymerization melt, either by addition to the caprolactam melt prior to polymerization or by addition to the molten mixture after appreciable or substantial polymerization is achieved. Examples of conventional "end-grouping agents" include adipic acid, butylammonium acetate and other substituted ammonium salts. A usual catalyst for polymerization of caprolactam is water, ordinarily added to the monomer in the range of about 0.1% to 1.5%.

Control of the viscosity (and thus the molecular weight) of nylon 6 is important, both for the production of uniform and readily processable nylon melts and for the maintenance of the desired physical properties of the resulting yarn. Numerical viscosity values for nylon 6 referred to herein are "relative viscosity" values; that is, the relative viscosity at 25° C. of a solution of one gram of the nylon 6 in 100 ml. of commercial concentrated (96%) sulfuric acid is measured by means of an Ostwald Viscometer, the viscosity of the sulfuric acid containing no nylon being taken as 1.00. Nylon 6 having a relative viscosity in the range of about 2.0 to about 3.3 is usually considered suitable for melt-extruding into yarn, from the processing standpoint. With regard to the physical properties required in the yarn, nylon 6 having a relative viscosity in the range of about 2.0 to 2.6 is suitable for production of textile nylon yarns; carpet yarns utilize nylon having a viscosity of about 2.6 to 2.9; and yarn for production of tirecord requires a nylon 6 having a relative viscosity in the range of about 2.9 to 3.3, and preferably in the range of about 2.95 to 3.15.

Conditions occasionally arise, in the manufacture of nylon 6, in which the relative viscosity of the nylon is below the desired value. Thus, adjustments must be made in the polymerization process, and there is need of a simple and certain technique for raising the nylon viscosity to the desired value. It is an object of the present invention to provide such technique and also to produce nylon 6 possessing improved stability towards heat and light.

The objects of the invention are accomplished by the addition of a very small amount of a metal pyrophosphate to the caprolactam monomer or to the polymerization reaction mixture prior to the melt-spinning of yarn from the resulting nylon. The addition of such metal pyrophosphate in the range of 0.00005% to 0.003% of pyrophosphate ions ($P_2O_7^{-4}$) is useful in carrying out the invention. All parts are herein expressed by weight unless otherwise stated. In order to obtain a maximum increase in the viscosity of the nylon it is essential that the molten nylon (or polymerization reaction mixture) containing the metal pyrophosphate be subjected to a vacuum of at least 20 inches of mercury for an appreciable interval of time. The viscosity-enhancing effect of the metal pyrophosphate becomes more pronounced as the degree of evacuation of the system is increased. A preferred vacuum is in the range of from zero to 10 mm. of mercury.

The metal of the metal pyrophosphate is preferably a heavy metal from the group including titanium, vanadium, chromium, manganese, iron, cobalt, nickel, copper, zinc, zirconium, molybdenum, silver, cadmium, tin, antimony, lead ad bismuth, and preferably is copper or manganese. Nylon yarn produced in accordance with the invention possesses improved stability to heat and light, as compared to comparable yarn containing no metal pyrophosphate. Also the invention can be utilized to increase the rate of production of nylon 6, thus increasing the effective capacity of a nylon 6 plant. In addition, the presence of a heavy metal pyrophosphate has been found to increase the viscosity of nylon 6 produced as chips during the spinning operation. Chips containing the pyrophosphate have increased more rapidly in viscosity upon extrusion than normal chips. The use of a vacuum vented extruder in this operation has markedly increased the polymer viscosity growth over a non-vented extruder. However, in all cases (vacuum vented, vented or non-vented extrusion) the viscosity increased more with chips containing a heavy metal pyrophosphate than with chips containing none of this material.

Application of a vacuum in accordance with the invention is conveniently combined with the usual vacuum stripping of unpolymerized caprolactam monomer from the nylon 6 prior to melt-spinning. When no change is made in the polymerization reaction time, it is noted that there is less monomer to be removed by stripping and that the polymer increases in viscosity in a shorter hold up time than usual. When nylon chips are produced prior to spinning of the yarn, the invention simplifies the water-extraction of monomer from the chips because of the lower monomer content thereof.

A modification of the invention results in a nylon 6 yarn of improved physical properties and enhanced resistance to light and heat. This modification includes adding a copper salt, soluble in caprolactum, to the monomer as a light and heat stabilizer for the resulting nylon 6. The amount of copper so added is in the range of about 0.0025% to about 0.05% of the caprolactam. Examples of copper salts include the chloride, bromide, fluoride, sulfite, acetate, sulfate, formate, stearate and naphthenate. Either cupric or cuprous salts can be used. It has been observed that the addition of such copper salts to the caprolactem causes the viscosity of the resulting nylon 6 to be lower than when no such soluble copper salt is present. The addition of from 0.01% to 0.09% of a metal salt of chlorine, bromine or iodine, based on the weight of the caprolactem, enhances the stabilizing effect of the soluble copper salt, examples of suitable metals being ammonium, lithium, sodium, potassium, magnesium and calcium. The addition of such metal halide usually intensifies the viscosity lowering effect of the soluble copper salt. It is expedient to reduce the amount of end-grouping agent (e.g., n-butylammonium acetate), but it is also desirable to add pyrophosphate in accordance with the invention, in order to produce improved nylon 6 and yarns thereof.

Copper pyrophosphate is conveniently prepared by the reaction of a water soluble copper salt with a soluble salt of pyrophosphoric acid. For example, two moles (299.3 grams) of cupric acetate, $Cu(C_2H_3O_2)_2 \cdot H_2O$, are dissolved in a minimum amount of water at 70° to 80° C. One mole (446 grams) of tetrasodium pyrophosphate, $Na_4P_2O_7 \cdot 10H_2O$, is dissolved in a minimum amount of water at 70° to 80° C. The latter solution is added rapidly, with stirring, to the cupric acetate solution, and the mixture is allowed to cool. The resulting precipitate of cupric pyrophosphate is separated from the reaction mixture by filtration, and the separated precipitate is washed several times with warm water to remove any unreacted acetate or pyrophosphate ions. The solid product, after drying, is a pale blue, finely divided powder.

Manganese pyrophosphate can be prepared by reaction of manganese sulfate with tetrasodium pyrophosphate. For example, 119 pounds of $MnSO_4 \cdot H_2O$ are dissolved in 30 to 35 gallons of hot deionized water, and 157 pounds of $Na_4P_2O_7 \cdot 10H_2O$ are dissolved in 40 to 45 gallons of hot deionized water. The hot solution of manganese sulfate is added to the hot solution of tetrasodium pyrophosphate with agitation. The resulting white precipitate of manganese pyrophosphate is separated by filtration, washed with hot deionized water to remove sulfate ions, and then dried. The product, amounting to about 100 pounds, can be ball-milled or hammer-milled to a very fine powder.

A preferred range of pyrophosphate ion concentration in the caprolactam and/or the resulting nylon 6 is from 0.0002% to 0.002%, in accordance with the invention.

The invention is illustrated by the following examples.

Example 1

A continuous polymerizer is charged with caprolactam containing 0.3% of water and the usual amount of end-grouping agent, and polymerization is continued until a nylon 6 is produced having, after vacuum-stripping of the monomer from the molten nylon at 4 mm. of mercury pressure, a relative viscosity of 3.00. A second run is made in the same equipment in the same manner except that 0.000075% of pyrophosphate is added as cupric pyrophosphate is added to the caprolactam before polymerization. The relative viscosity of the second run of nylon 6 is 3.05. The nylons from both runs are readily converted into tirecords, the tenacity of the tire cord made from the second run being appreciable higher than that made from the first run.

Example 2

A conventional polymerization of caprolactam is carried out and one portion of the resulting nylon 6 is used to produce chips the nylon of which, after a conventional water extraction to remove monomer, possesses a relative viscosity of 2.95. To another portion of the molten nylon from said polymerization is added 0.002% of pyrophosphate as manganese pyrophosphate, and then the mixed portion is extruded and the resulting filaments are cut into chips. The two portions of chips are separately melt-extruded to yarn by means of a vacuum-vented extruder, and the separate yarns are processed into separate samples to tirecord by conventional techniques. It is found that the tirecord produced from the nylon containing the manganese pyrophosphate possesses an appreciably higher tenacity than the tirecord made from the control nylon. Also the relative viscosity of the nylon containing the manganese pyrophosphate, after spinning into yarn, as described, is found to be about 3.10. For comparison, the relative viscosity of the nylon of the control yarn is less than 3.00.

Example 3

Caprolactam containing 0.01% of copper, added as copper stearate, and 0.0002% of pyrophosphate ion, added as copper pyrophosphate, is polymerized to nylon 6. After the usual vacuum stripping at a pressure of about 2 mm. of mercury, the resulting nylon is melted-extruded into yarn, which is converted into tirecord. The tenacity of the tirecord is measured, and then a portion of the cord is exposed to heat-aging while under very slight tension (to minimize de-orientation) in a circulating air oven for 16 hours at 177° C. The tenacity of the heat-aged cord is found to be more than 70% of the tenacity of the unaged cord. In comparison, it has been found that a comparable nylon 6 tirecord containing no pyrophosphate or copper or other stabilizer retains after such heat-aging less than 30% of its unaged tenacity.

Example 4

Caprolactam containing 0.0125% of copper, added as copper stearate, and 0.0001% of pyrophosphate ion, added as manganese pyrophosphate, is polymerized to nylon 6. The polymerized mixture is stripped of monomer and water under a vacuum of 10 to 20 mm. of mercury and the resulting nylon is found to possess a relative viscosity in the range of 3.15 to 3.20. The nylon is readily melt-spun into yarn, and the latter is converted into tirecord having a tenacity of 9 grams per denier. The tirecord is found to possess a high degree of stability towards both heat and actinic light.

Example 5

Caprolactam containing 0.02% of copper, added as cupric acetate and 0.05% of ammonium chloride, is polymerized to nylon 6 which, after vacuum stripping, possesses a relative viscosity of 2.80, too low for production of commercial tirecord. A second run of caprolactam containing the same additives and in addition 0.0014% of pyrophosphate ion, added as cupric pyrophosphate, produced a nylon 6 which, after vacuum stripping, possesses a relative viscosity of 3.03. Conventionally oriented tirecord produced from this second nylon run was of a uniform light color with enhanced physical properties, including a tenacity of 9 grams per denier, and with excellent stability towards actinic light and towards heat. As evidence of the improvde heat stability, the tirecord retains approximately 90% of its unaged tenacity after the aging test described in Example 3. Similar excellent results are obtained when the ammonium chloride of this example is replaced by an equal weight of potassium iodide.

Example 6

Caprolactam containing 0.02% of copper, added as copper acetate, 0.05% of ammonium chloride and 0.0007% of pyrophosphate, added as copper pyrophosphate, was polymerized to nylon 6. After a vacuum stripping of the liquid reaction mixture at a pressure of 1 to 10 mm. of mercury, the resulting nylon 6 possessed a relative viscosity of 3.02. The nylon 6 was converted into oriented tirecord of a uniform light color, with a tenacity of 8.84 grams per denier, and with excellent light and heat stability, fully comparable to the improved tirecord produced from the second run of nylon 6 of Example 5.

Reference is made above to treatment of liquid nylon 6 containing pyrophosphate in accordance with the invention to a vacuum of at least 20 inches of mercury. This vacuum corresponds to a pressure of no more than one-third atmosphere, that is, to a pressure of no more than about 253 mm. of mercury.

I claim:

1. Process of increasing the relative viscosity of poly-omega-caproamide, which comprises adding to caprolactam, to poly-omega-caproamide or to the intermediate polymerization mixture from 0.00005% to 0.003% of pyrophosphate ions supplied by a metal pyrophosphate, and subjecting the resulting polyamide containing the pyrophosphate to a pressure no greater than about 253 mm. of mercury while the polyamide is in a liquid state.

2. Process of claim 1 in which the pressure is that of a vacuum of from zero to 10 mm. of mercury.

References Cited

UNITED STATES PATENTS

| | | | |
|---|---|---|---|
| 2,960,489 | 11/1960 | Gabler | 260—45.75 |
| 2,984,647 | 5/1961 | White | 260—45.75 |
| 3,160,597 | 12/1964 | Costain | 260—21 |
| 3,228,898 | 1/1966 | Illing | 260—18 |

OTHER REFERENCES

Industrial and Engineering Chemistry, vol. 53, No. 10, pp. 826–828 (1961).

DONALD E. CZAJA, *Primary Examiner.*

U. P. HOKE, *Assistant Examiner.*

U.S. Cl. X.R.

260—45.7, 78